United States Patent [19]

Vasseur

[11] 4,179,663

[45] Dec. 18, 1979

[54] DEVICES FOR GENERATING PSEUDO-RANDOM SEQUENCES

[75] Inventor: Jean-Pierre Vasseur, Paris, France

[73] Assignee: Thomson-CSF, Paris, France

[21] Appl. No.: 813,178

[22] Filed: Apr. 3, 1969

[30] Foreign Application Priority Data

Apr. 10, 1968 [FR] France .................. 68.147660

[51] Int. Cl.² .................. H03K 1/00; H04L 9/00
[52] U.S. Cl. .................. 328/59; 178/22; 328/63; 331/78; 340/348
[58] Field of Search .................. 328/63, 179, 59; 307/269; 331/78; 340/348; 178/22

[56] References Cited

U.S. PATENT DOCUMENTS

| 2,872,514 | 2/1959 | Negri ................... 178/22 |
| 3,250,855 | 5/1966 | Vasseur ................ 340/348 |
| 3,402,265 | 9/1968 | Couvillon, Jr. ........ 328/63 X |
| 3,439,279 | 4/1969 | Guanella .............. 328/63 |
| 3,521,185 | 7/1970 | Ley ................... 328/63 X |

FOREIGN PATENT DOCUMENTS

| 709084 | 5/1965 | Canada ................ 340/348 |
| 211163 | 6/1966 | U.S.S.R. .............. 331/78 |

OTHER PUBLICATIONS

McGuire, A Simple Synchronizing Circuit, IBM Technical Disclosure Bulletin, Feb. 1961, p. 9.

Primary Examiner—S. C. Buczinski
Attorney, Agent, or Firm—Cushman, Darby & Cushman

[57] ABSTRACT

In a binary system, for example, the "0" and the "1" are rendered more equi-probable in the output pseudo-random sequences of a switch controlled in a pseudo-random way by feeding to the inputs of the switch input sequences which are two and two complementary, i.e. the sum of two simultaneous digits of two such sequences is always 1.

4 Claims, 2 Drawing Figures

DEVICES FOR GENERATING PSEUDO-RANDOM SEQUENCES

The present invention relates to an improvement in devices for generating pseudo-random sequences of binary or other digits, which devices find a particularly important application in key generators of the kind used in cipher links.

It is well known that it is possible to create this kind of a link using two identical synchronized key generators, one located in the transmitter and the other in the receiver, the first producing, in respect of each number translating a plain language character, another number known as the key, which is combined with the first in order to form the number translating the ciphered letter, and the second producing the same key number which is combined with the number translating the ciphered letter in order to reconstitute the number which translates the plain language letter.

The essential requirement which a key generator must satisfy, is therefore that it provides a sequence of key numbers of pseudo-random character, that is to say that, whilst obeying strictly defined laws (something which is necessary for purposes of identity between the sequences of key numbers furnished by the two key generators), it nevertheless has the most unexpected appearance possible vis-a-vis a third party (this is necessary for secrecy of communication).

This result is achieved by a step-by-step procedure, that is to say by improving in several stages the psuedo-random character of successively generated sequences of numbers.

Since a number is made up of digits, the problem boils down to generating sequences of pseudo-random digits, which sequences should have the least possible degree of correlation between them.

At this point, some of the terms and symbols which are to be used at a later point in this description, will be defined.

A digit in a sequence will be designated by a letter carrying a high index signifying the sequences and a low index or subscript indicating the position number of the digit in the sequences.

Two sequences of digits $a_i^1$ and $a_i^2$ will be described as simultaneous if, whatever i is, $a_i^1$ and $a_i^2$ appear simultaneously at two terminals of a circuit.

In a numerical system of base b, b simultaneous sequences will be termed complementary if the digits which they exhibit simultaneously constitute the b digits of the system. For $b=2$, two sequences $a_i^1$ and $a_i^2$ will therefore be complementary if, whatever i is, simple addition gives $a_i^1 + a_i^2 = 1$ or, in the Boolean algebra, $a_i^1 = \overline{a_i^2}$.

One of the known methods of obtaining from N simultaneous pseudo-random input sequences of digits, N' simultaneous output sequences (N' is generally less than N) whose pseudo-random character is improved, consists in using a switch having N signal inputs to which there are applied the N input sequences, N' outputs, and control inputs to which there are applied control signals which in a pseudo-random manner link each of the N' outputs with one of the N inputs.

The fundamental conditions which must be satisfied in order to achieve a "good" pseudo-random sequence, are as follows:

The periodicity P should be a long ("pseudo-aperiodicity");

each digit of base b should appear on average and approximately, the same number of times, not merely during one period but throughout most of the partial sequences of some length occurring during a period ("equi-probability").

Neither of these two conditions on its own will suffice. A period P of 100,000 digits made up of 99,999 and "0" and 1 "1" will obviously not be a satisfactory pseudo-random sequences. Conversely, a sequence composed of alternately "0" and "1", is not a random one.

In fact, experience shows that it is often difficult to completely satisfy the two conditions without resorting to very complex circuitry.

It is the object of the present invention to create a relatively simple device which makes it possible to generally satisfy these two conditions by concentrating primarily on the production of sequences which are satisfactory from the aperiodicity point of view, and then improving the equi-probability aspect, this latter operation normally also being accompanied by a further improvement in the aperiodicity.

According to the invention, there is provided a device for delivering N' pseudo-random sequences of digits in a system of base b, b being an integer greater than 1, and N' being an integer, said device comprising: a sequence generator, having m outputs, for respectively delivering thereto m sequences of digits, referred to as primary sequences, m being an integer; p devices having respective inputs respectively coupled to p of said m outputs, for deriving from each one of p of said primary sequences the (b−1) complementary sequences thereof, p being an integer smaller than m+1; a switch having m+p(b−1) inputs and N' outputs for delivering said pseudo-random sequences; means for respectively applying said m primary sequences and said p(b−1) complementary sequences to said inputs of said switch; and a control system for connecting each output of said switch to one of the inputs thereof for each set of simultaneous digits respectively applied to the inputs thereof.

the invention will be better understood and other of its features rendered apparent, by a consideration of the ensuing description and the related drawings, in which latter:

The invention will be described in terms of its most widely used application, that is to say in terms of the binary system.

It will also be assumed, albeit this is in no way limitative of the scope of the invention, that the digits "0" and "1" are respectively expressed by two voltage levels of predetermined duration appearing on one and the same wire, two successive digits being contiguous.

Figure 1:
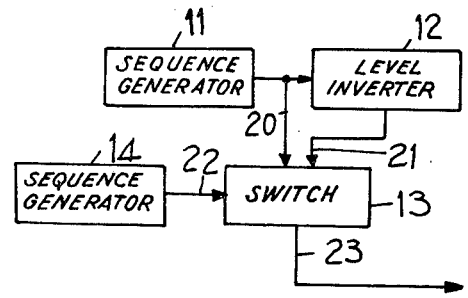
FIG. 1 illustrates the principle of the device.

FIG. 1 illustrates a device which is of limited practical interest because of its simplicity, however it will suffice to point out the significance of the present invention.

The reference 11 designates a generator device producing a pseudo-random sequence $S_1$, whose output is connected on the one hand directly to the first input 20 of an electronic switch 13, and on the other hand to the second input 21 of said switch via a level inverter 12 producing a "0" when it receives a "1" and vice versa.

The switch has a single output 23 and a control input 22 connected to the output of a generator 14 producing a pseudo-random sequence of $S_c$ of binary control digits.

The switch is such that when it receives the digit "0" at its control input 22, it connects its output to its input 20, and that when it receives the digit "1", it connects its output to its input 21.

It will be assumed that neither the sequence $S_1$ nor the sequence $S_c$ are satisfactory from the point of view of equi-probability of the "1" and the "0", and it will be assumed that over a certain time interval the sequence $S_1$ has a probability of $0.5+\alpha$ of producing the "0" and the sequence $S_c$ a probability of $0.5+\beta$, the symbols $\alpha$ and $\beta$ being two positive or negative digits smaller in absolute value than 0.5.

In these circumstances, the probability of a "0" appearing at the output is, for each output digit:

$$(0.5+\beta)(0.5+\alpha)+(0.5-\beta)(0.5-\alpha)=0.5+2\alpha\beta.$$

If, for example, $\alpha=0.1$ and $\beta=0.1$ and thus those sequences are highly deficient from the equi-probability point of view since each one presents a probability of 0.6 for "0" as against 0.4 for "1", the output sequences will a priori only have a probability of 0.52 of a "0" as against 0.48 of a "1".

Moreover, if either $\alpha$ or $\beta$ alone is zero or very small, for example $\alpha=0.2$, $\beta=0$, the output sequences will a priori have a "0" probability of 0.5 or close to 0.5.

Figure 2:
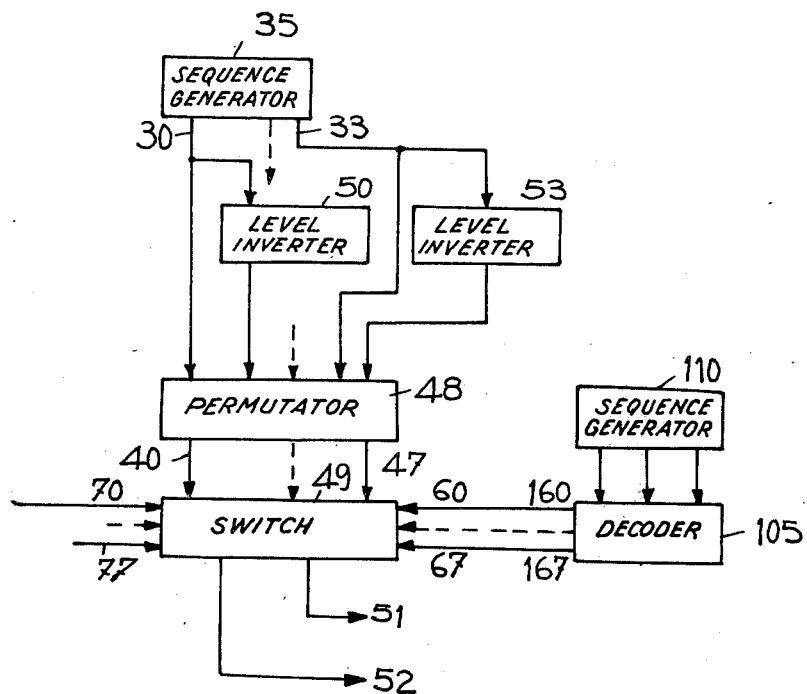
FIG. 2 is a diagram of a more complex version.

FIG. 2 illustrates a more complex device.

A generator 35 producing primary sequences has four outputs 30 to 33; a switch 49 has eight signal inputs 40 to 47 and two outputs 51 and 52.

Each of the outputs 30 to 33 supplies a respective inverter 50 to 53, and the outputs 30 to 33 as well as the outputs of the inverters 50 to 53, are connected respectively to the eight inputs 40 to 47 of the switch 49 through a permutator 48.

By permutator is meant a component with n inputs and n outputs (n being equal to 8 in the present case) and variable (for example manually variable) one-to-one connections between the n inputs and the n outputs.

The switch has two groups of eight control inputs 60 to 67 and 70 to 77.

A device generating control signal comprises a generator 110 producing at three outputs three pseudo-random sequences, these three outputs supplying a decoder 105, the eight outputs 160 to 167 of which are respectively connected to the control inputs 60 to 67 of the switch.

For each binary number q, between 0 and 7, said number being formed by the output digits delivered by the generator 110, one and one alone of the outputs 160 to 167 of the control assembly, namely the output $160+q$, will receive a voltage such that the output 51 of the switch is connected to the input $40+q$ of said switch.

The connection of the output 52 of the switch is effected in the same fashion by means of signals applied to its inputs 70 to 77. The corresponding control arrangement has not been illustrated. It may also be combined with the first.

In order to simplify the drawing, the inputs, control inputs or multiple outputs, have simply been designated by their first and their last elements, the others having been symbolized by a broken-line arrow. Similarly, exclusively the inverters 50 and 53 have been shown.

If the apparent probability of "0" in the sequences applied to the input $40+i$ of the switch 49, is designated by $\frac{1}{2}+\epsilon_i$, and the probability that the output 51 will be connected to the output $40+i$ by $\frac{1}{8}+\gamma_i$, then the probability of a "0" in the output signal is given by $$\Sigma(\tfrac{1}{8}+\gamma_i)(\tfrac{1}{2}+\epsilon_i)=\tfrac{1}{2}+\tfrac{1}{8}\Sigma\epsilon_i+\tfrac{1}{2}\Sigma\epsilon_i+\Sigma\epsilon_i\gamma_i.$$

Since $\Sigma\epsilon_i=0$, because the terms of this sum cancel one another out in pairs and $\Sigma\epsilon_i$ is necessarily equal to 0, all that is left in this expression is the $\frac{1}{2}$ term and the second order term $\Sigma\epsilon_i\gamma_i$, whatever the control signals respectively supplied to the various inputs.

It will be observed that the laws according to which the output signals are derived from the input and control signals to the switch can be varied by modifying the connections between inputs and outputs of the permutating device 48.

Of course, the invention is in no way limited to the embodiment described or illustrated. In particular, its extension to a system other than the binary system, is entirely within the scope of the person skilled in the art.

What is claimed is:

1. A device for delivering N' pseudo-random sequences of digits in a system of base b, b being an integer greater than 1, and N' being an integer, said device comprising: a sequence generator, having m outputs, for respectively delivering thereto m sequences of digits, referred to as primary sequences, m being an integer; p devices having respective inputs respectively coupled to p of said m outputs, for deriving from each one p of said primary sequences the $(b-1)$ complementary sequences thereof, p being an integer smaller than $m+1$; a switch having $m+p(b-1)$ inputs and N' outputs for delivering said pseudo-random sequences; means for respectively applying said m primary sequences and said $p(b-1)$ complementary sequences to said inputs of said switch; and a control system for connecting each output of said switch to one of the inputs thereof for each set of simultaneous digits respectively applied to the inputs thereof.

2. A device as claimed in claim 1, wherein $b=2$.

3. A device as claimed in claim 1, wherein $p=m$.

4. A device as claimed in claim 1, wherein m is greater than 1.

* * * * *